(12) United States Patent
Hamada et al.

(10) Patent No.: US 12,491,758 B2
(45) Date of Patent: *Dec. 9, 2025

(54) DOOR WEATHER STRIP

(71) Applicant: TOYODA GOSEI CO., LTD., Kiyosu (JP)

(72) Inventors: Shinnosuke Hamada, Kiyosu (JP); Masatoshi Nojiri, Kiyosu (JP)

(73) Assignee: TOYODA GOSEI CO., LTD., Aichi-pref. (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/454,958

(22) Filed: Aug. 24, 2023

(65) Prior Publication Data

US 2024/0100927 A1 Mar. 28, 2024

(30) Foreign Application Priority Data

Sep. 22, 2022 (JP) .................................. 2022-150916

(51) Int. Cl.
*B60J 10/86* (2016.01)
*B60J 10/16* (2016.01)
*B60J 10/246* (2016.01)

(52) U.S. Cl.
CPC ............ *B60J 10/86* (2016.02); *B60J 10/16* (2016.02); *B60J 10/246* (2016.02)

(58) Field of Classification Search
CPC ........... B60J 10/86; B60J 10/16; B60J 10/246
USPC .................... 49/484.1, 489.1, 495.1
See application file for complete search history.

(56) References Cited

U.S. PATENT DOCUMENTS

| | | | | |
|---|---|---|---|---|
| 3,685,206 | A * | 8/1972 | Kessler | B29C 48/22 156/279 |
| 4,819,381 | A * | 4/1989 | Kitaura | B60J 10/24 49/489.1 |
| 5,918,421 | A * | 7/1999 | Nozaki | B60J 10/35 49/492.1 |
| 6,601,346 | B2 * | 8/2003 | Nozaki | B60J 10/25 49/480.1 |
| 11,780,309 | B2 * | 10/2023 | Hamada | B60J 10/16 49/155 |
| 2014/0000174 | A1 * | 1/2014 | Minagawa | B60J 10/86 49/483.1 |

(Continued)

FOREIGN PATENT DOCUMENTS

| | | | | |
|---|---|---|---|---|
| JP | 59040937 | A * | 3/1984 | ........... B60J 10/16 |
| JP | S59-40937 | A | 3/1984 | |
| JP | 2006-298204 | A | 11/2006 | |

(Continued)

OTHER PUBLICATIONS

Machine translation of JP5940937A.*

*Primary Examiner* — Marcus Menezes
(74) *Attorney, Agent, or Firm* — Posz Law Group, PLC (57) ABSTRACT

A door weather strip includes an attachment base that is attached to a door frame or a door molding, and a seal lip that abuts on a vehicle body opening peripheral edge when a door is closed, in which the vehicle body opening peripheral edge side at a tip of the seal lip is formed with a protrusion that abuts on the vehicle body opening peripheral edge when the door is closed, and the seal lip is formed with a hard portion harder than a material constituting the seal lip to extend from a lower region of the protrusion to a root side of the seal lip.

10 Claims, 9 Drawing Sheets

(56) References Cited

U.S. PATENT DOCUMENTS

2015/0283888 A1* 10/2015 Togashi .................. B60J 10/15
49/480.1

FOREIGN PATENT DOCUMENTS

| JP | 2010-36602 A | 2/2010 |
| JP | 2022-48478 A | 3/2022 |

* cited by examiner

INSIDE VEHICLE ← → OUTSIDE VEHICLE

INSIDE VEHICLE ←→ OUTSIDE VEHICLE

INSIDE VEHICLE ←——→ OUTSIDE VEHICLE

FIG.10 Prior Art

INSIDE VEHICLE ←——→ OUTSIDE VEHICLE

DOOR WEATHER STRIP

CROSS REFERENCE TO RELATED APPLICATION

This application claims the priority benefit of Japanese Patent Application No. 2022-150916 filed on Sep. 22, 2022. The entirely of the above-mentioned patent application is hereby incorporated by reference herein and made a part of this application.

BACKGROUND OF THE INVENTION

(1) Field of the Invention

The present invention relates to, for example, a door weather strip attached to an outer periphery of a door frame of a door for a motor vehicle.

(2) Description of Related Art

Figure 9:
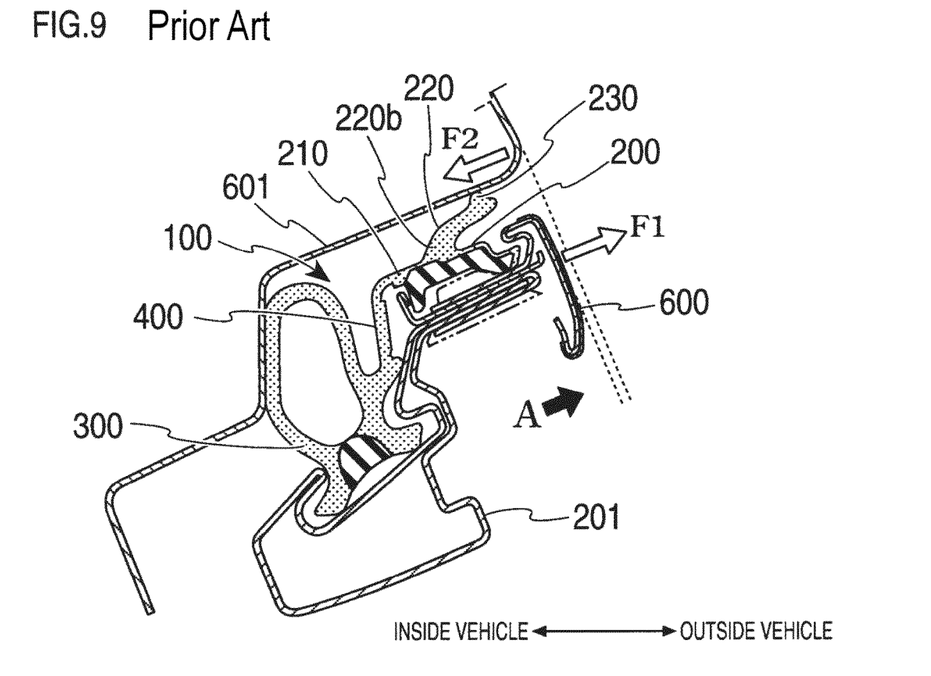
FIG. 9 is a cross-sectional view of a conventional door weather strip taken along the line A-A in FIG. 1 (Japanese Patent Application Laid-Open No. 2010-36602)

For example, as shown in FIG. 9, a door weather strip 100 is attached to a door frame 201 and a door molding 600.

The door weather strip 100 includes a vehicle exterior weather strip 200, a vehicle interior weather strip 300, and a weather strip connector 400. The vehicle exterior weather strip 200 includes a vehicle exterior attachment base 210 and a vehicle exterior seal 220 (a seal lip). A protrusion 230 is formed at a tip 220a of the vehicle exterior seal 220 that is in a vehicle width direction inward (inside the vehicle). When the door is closed, the protrusion 230 abuts on a vehicle body opening peripheral edge 601, and a root 220b of the vehicle exterior seal 220 is deformed toward the vehicle exterior attachment base 210 side to close a gap between the vehicle body opening peripheral edge 601 and a tip of the door molding 600. The vehicle exterior seal 220 can be easily deformed to reduce a door closing force since the seal is in a lip shape (for example, Japanese Patent Application Laid-Open No. 2010-36602).

Incidentally, since a pressure outside the vehicle becomes significantly lower than a pressure inside the vehicle on the door during a high-speed travelling of the motor vehicle, a force F1 is generated in a direction where the door frame 201 and the door molding 600 are sucked out of the vehicle shown in FIG. 9 due to a pressure difference. At that time, a reaction force F2 is generated in a direction inside the vehicle between the vehicle body opening peripheral edge 601 and the vehicle exterior seal 220 (the protrusion 230) elastically in contact with the vehicle body opening peripheral edge 601.

However, since the vehicle exterior seal 220 is in the lip shape and easily deformed, the vehicle exterior seal 220 is largely deflected and deformed in an arc shape as shown in FIG. 9 as the F1 increases, and as a result, the door frame 201 and the door molding 600 move in a direction of an arrow A. The movement of the door frame 201 and the door molding 600 out of the vehicle, that is, a phenomenon of being sucked out of the vehicle deteriorates a sound insulation property.

Figure 10:
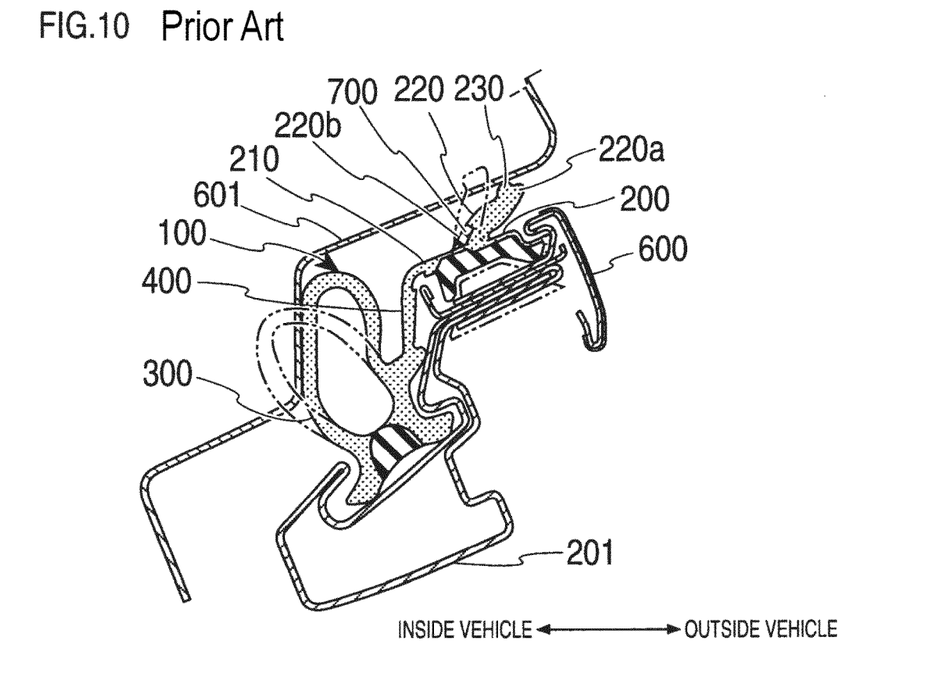
FIG. 10 is a cross-sectional view of a conventional door weather strip taken along the line A-A in FIG. 1 (Japanese Patent Application Laid-Open No. 2022-48478)

As a countermeasure against the sucking out of the door frame 201, techniques below are described in, for example, Japanese Patent Application Laid-Open No. 2022-48478. As shown in FIG. 10, a hard portion 700 using a solid material of an EPDM harder than a sponge material of the EPDM constituting the seal lip 220 is formed on the seal lip 220 of the door weather strip 100 in the vehicle width direction inward (inside the vehicle).

The hard portion 700 is formed to be exposed from the root 220b of the seal lip 220 to a slightly lower central portion, that is, to a portion inside the vehicle where the seal lip 220 in FIG. 9 is largely deflected and deformed in the arc shape.

In a case where the force F1 on the door frame 201 toward a vehicle width direction outward is generated due to a pressure difference inside and outside the vehicle during the travelling of the vehicle by forming the hard portion 700 in the seal lip 220, since the hard portion 700 formed in the seal lip 220 can prevent the seal lip 220 from being deflected by a certain amount or more, the reaction force F2 toward the vehicle width direction inward (inside the vehicle) generated between the seal lip 220 (the protrusion 230) and the vehicle body opening peripheral edge 601 can be made equal to the F1 or close to the F1.

As a result, since it is possible to suppress sucking of the door frame 201 out of the vehicle, it is possible to improve the sound insulation property during the high-speed travelling.

SUMMARY OF THE INVENTION

However, in a technique of Japanese Patent Application Laid-Open No. 2022-48478, since the seal lip 220 including the protrusion 230 other than a portion where the hard portion 700 is formed, particularly, the tip 220a side of the seal lip 220 is still easily deflected, it takes time to cause the tip 220a side to be deflected, the hard portion 700 to exert effects, and the reaction force F2 to be equal to the F1 or close to the F1 when the force F1 on the door frame 201 toward the vehicle width direction outward (outside the vehicle) is generated due to the pressure difference inside and outside the vehicle during the high-speed traveling of the motor vehicle. As a result, the door frame 201 would be sucked out of the vehicle for a period of time until then.

Figure 11A:
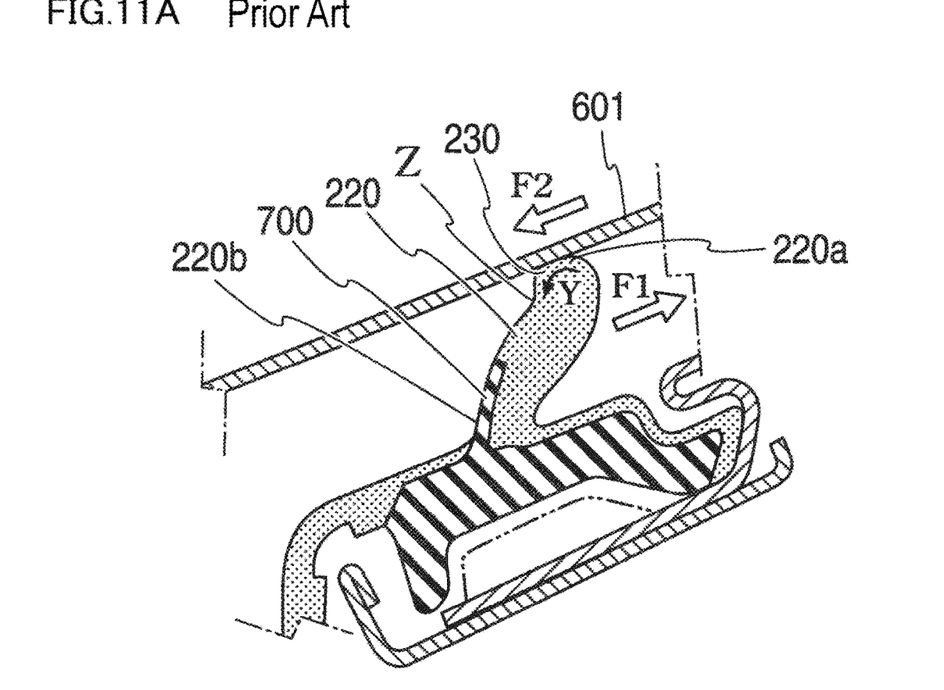
FIG. 11A is a view showing a behavior when a force in a sucking direction works during a high-speed traveling in FIG. 10.
Figure 11B:
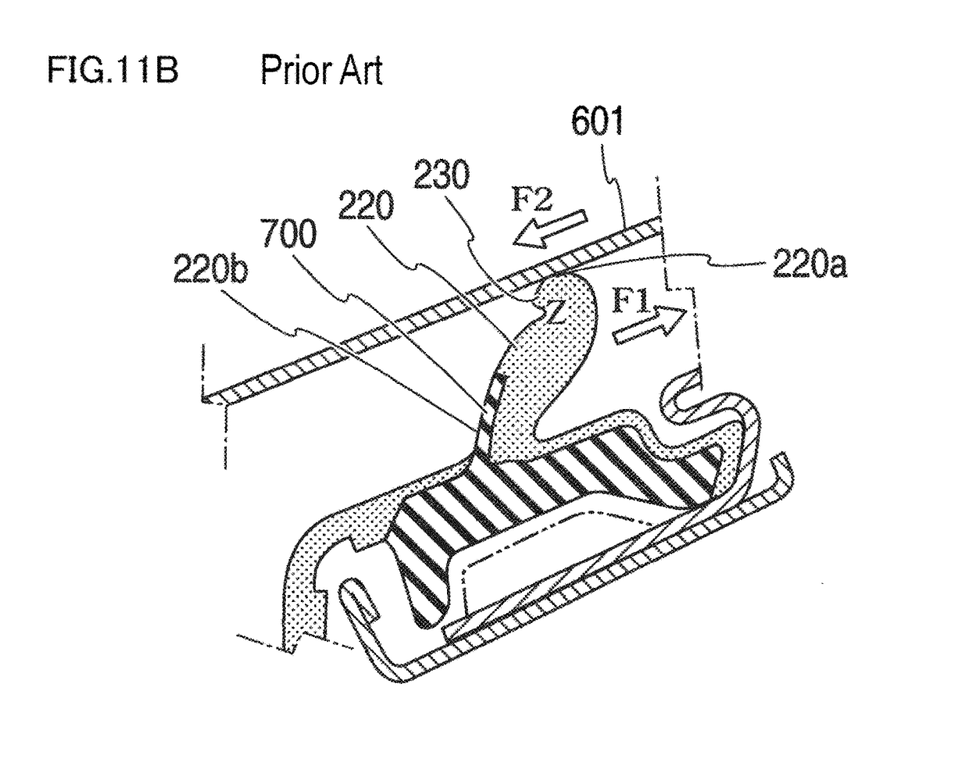
FIG. 11B is a view showing a behavior when the F2 is increased as compared to FIG. 11A.

Further, when the reaction force F2 is generated, as shown in FIG. 11A, the protrusion 230 is rotated and deformed toward the root 220b side in a direction of a solid arrow Y, a portion abutting on the vehicle body opening peripheral edge 601 by the protrusion 230 is enlarged in a region from the protrusion 230 to the tip 220a to increase an abutment area on the vehicle body opening peripheral edge 601, and the reaction force F2 can be increased. However, as the reaction force F2 is a certain value or more, a phenomenon of bending the protrusion 230 at a base Z on the root 220b side of the seal lip 220 of the protrusion 230 occurs in as shown in FIG. 11B. The bending phenomenon prevents an increase in the reaction force F2, and combined with the deflection on the tip 220a side of the seal lip 220, the effects of hard portion 700 become insufficient.

An object of the present invention is to provide a door weather strip for a motor vehicle that can further suppress sucking of a door frame of a door for the motor vehicle out of the vehicle due to a pressure difference inside and outside the vehicle during a high-speed traveling of the motor vehicle.

In order to solve the problems above, according to a first disclosed aspect, provided is a door weather strip that seals a space between a door of a motor vehicle and a vehicle body opening peripheral edge and is attached to an outer periphery of a door frame of the door, the door weather strip including an attachment base that is attached to the door frame or a door molding, and a seal lip that abuts on the vehicle body opening peripheral edge when the door is closed, in which the vehicle body opening peripheral edge side at a tip of the seal lip is formed with a protrusion that abuts on the vehicle body opening peripheral edge when the door is closed, and the seal lip is formed with a hard portion harder than a material constituting the seal lip to extend from a lower region of the protrusion to a root side of the seal lip.

According to the first disclosed aspect, the door weather strip includes the attachment base that is attached to the door frame or the door molding, and the seal lip that abuts on the vehicle body opening peripheral edge when the door is closed, in which the vehicle body opening peripheral edge side at the tip of the seal lip is formed with the protrusion that abuts on the vehicle body opening peripheral edge when the door is closed, and the seal lip is formed with the hard portion harder than the material constituting the seal lip to extend from the lower region of the protrusion to the root side of the seal lip. Therefore, firstly, when a force F1 on the door frame toward a vehicle width direction outward (outside the vehicle) is generated due to a pressure difference inside and outside the vehicle during a high-speed traveling of the motor vehicle, a deflection of the tip of the seal lip is reduced, and thus it is possible to shorten time for a reaction force F2 toward a vehicle width direction inward (inside the vehicle) to be equal to the force F1 or close to the F1 in a direction where the door frame is sucked out of the vehicle.

Secondly, since the hard portion also exists in the lower region of the protrusion, the protrusion can be prevented from being bent at a base on the root side of the seal lip, and the reaction force F2 can be equal to the F1 or closer to the F1 even when the reaction force F2 increases. As a result, it is possible to suppress sucking of the door frame out of the vehicle.

A second disclosed aspect includes the door weather strip in which the hard portion is not formed at a portion where the seal lip is greatly deformed when the door is opened or closed, or is formed thinner than the tip side of the seal lip.

Forming the hard portion to extend from the lower region of the protrusion to the root side of the seal lip reduces the deflection of the tip of the seal lip, and preventing the protrusion from being bent and deformed has an effect of increasing the reaction force F2, but in a case where the hard portion is formed to extend to a vicinity of the root of the seal lip, the seal lip is hardly deflected when the door is closed, a resistance is increased when the door is closed, and the door is hardly closed.

According to the second disclosed aspect, since the hard portion is not formed at the portion where the seal lip is greatly deformed when the door is opened or closed, or is formed thinner than the tip side of the seal lip, it is possible to prevent the door from being hardly closed while maintaining effects of the hard portion.

A third disclosed aspect includes the door weather strip in which the hard portion extends in a direction of the tip of the seal lip and also in a direction of the seal lip outside the vehicle on the tip side of the seal lip.

According to the third disclosed aspect, the hard portion is formed on the tip side of the seal lip to extend in a direction of the tip of the seal lip and also in a direction of the seal lip outside the vehicle, that is, in the lower region of the protrusion of the seal lip, the hard portion is thick to protrude more outside the vehicle than toward the direction of the tip of the seal lip. Therefore, firstly, the deflection of the tip of the seal lip is further reduced, and it is possible to shorten the time for the reaction force F2 to be equal to the F1 or close to the F1 due to the hard portion.

Secondly, making the hard portion thick to protrude more outside the vehicle than toward the direction of the tip of the seal lip can prevent the door from being hardly closed while maintaining the effects of the hard portion even in a case where the hard portion is not formed at the portion where the seal lip is greatly deformed or is formed thinner than the tip side of the seal lip when the door is opened or closed.

A fourth disclosed aspect includes a door weather strip that seals a space between a door of a motor vehicle and a vehicle body opening peripheral edge and is attached to an outer periphery of a door frame of the door, the door weather strip including an attachment base that is attached to the door frame or a door molding, and a seal lip that abuts on the vehicle body opening peripheral edge when the door is closed, in which the vehicle body opening peripheral edge side at a tip of the seal lip is formed with a protrusion that abuts on the vehicle body opening peripheral edge when the door is closed, and the seal lip is formed with a hard portion harder than a material constituting the seal lip in a region that includes the protrusion and a vicinity of a base on a root side of the seal lip of the protrusion, and crosses the seal lip in a direction of the tip of the seal lip from a vehicle interior to a vehicle exterior.

According to the fourth disclosed aspect, the seal lip is formed with the hard portion harder than the material constituting the seal lip in the region that includes the protrusion and the vicinity of the base on the root side of the seal lip of the protrusion, and crosses the seal lip in the direction of the tip of the seal lip from the vehicle interior to the vehicle exterior, and thus an amount of the deflection of the tip of the seal lip is extremely reduced due to the hard portion, and it is possible to shorten the time for the reaction force F2 to be equal to the F1 or close to the F1. Further, since the tip of the seal lip includes the protrusion and is formed by the hard portion, the reaction force F2 can be equal to the F1 or close to the F1 even in a case where the root side of the seal lip is deflected other than the hard portion. As a result, it is possible to suppress sucking of the door frame out of the vehicle.

A fifth disclosed aspect includes the door weather strip in which the hard portion is formed to extend to the root side of the seal lip.

According to the fifth disclosed aspect, since the hard portion is formed to extend to the root side of the seal lip, the deflection of the seal lip can be suppressed, and the reaction force F2 can be equal to the F1 or close to the F1 due to the hard portion.

The door weather strip sealing a space between the door of the motor vehicle and the vehicle body opening peripheral edge and attached to the outer periphery of the door frame of the door, the door weather strip including the attachment base that is attached to the door frame or the door molding, and the seal lip that abuts on the vehicle body opening peripheral edge when the door is closed, in which the vehicle body opening peripheral edge side at the tip of the seal lip is formed with the protrusion that abuts on the vehicle body opening peripheral edge when the door is closed, and the seal lip is formed with the hard portion harder than the material constituting the seal lip to extend from the lower region of the protrusion to the root side of the seal lip. Therefore, firstly, when a force F1 on the door frame toward a vehicle width direction outward (outside the vehicle) is generated due to a pressure difference inside and outside the vehicle during a high-speed traveling of the motor vehicle, a deflection of the tip of the seal lip is reduced, and thus it is possible to shorten time for a reaction force F2 toward a vehicle width direction inward (inside the vehicle) to be equal to the force F1 or close to the F1 in a direction where the door frame is sucked out of the vehicle.

Secondly, since the hard portion also exists in the lower region of the protrusion, the protrusion can be prevented from being bent at a base on the root side of the seal lip, and the reaction force F2 can be equal to the F1 or closer to the F1 even when the reaction force F2 increases. As a result, it is possible to suppress sucking of the door frame out of the vehicle.

DETAILED DESCRIPTION OF PREFERRED EMBODIMENTS

Figure 1:
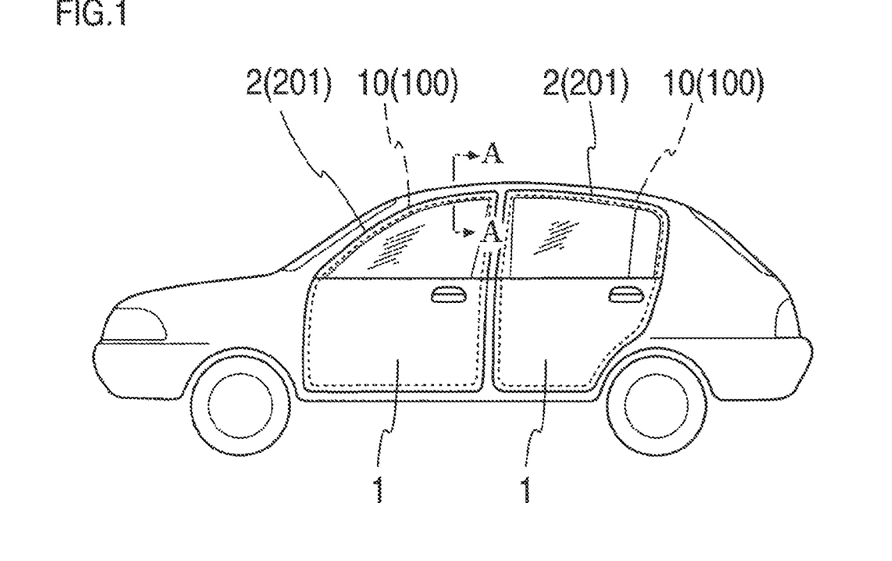
FIG. 1 is a side view of a door of a motor vehicle used in embodiments.
Figure 3A:
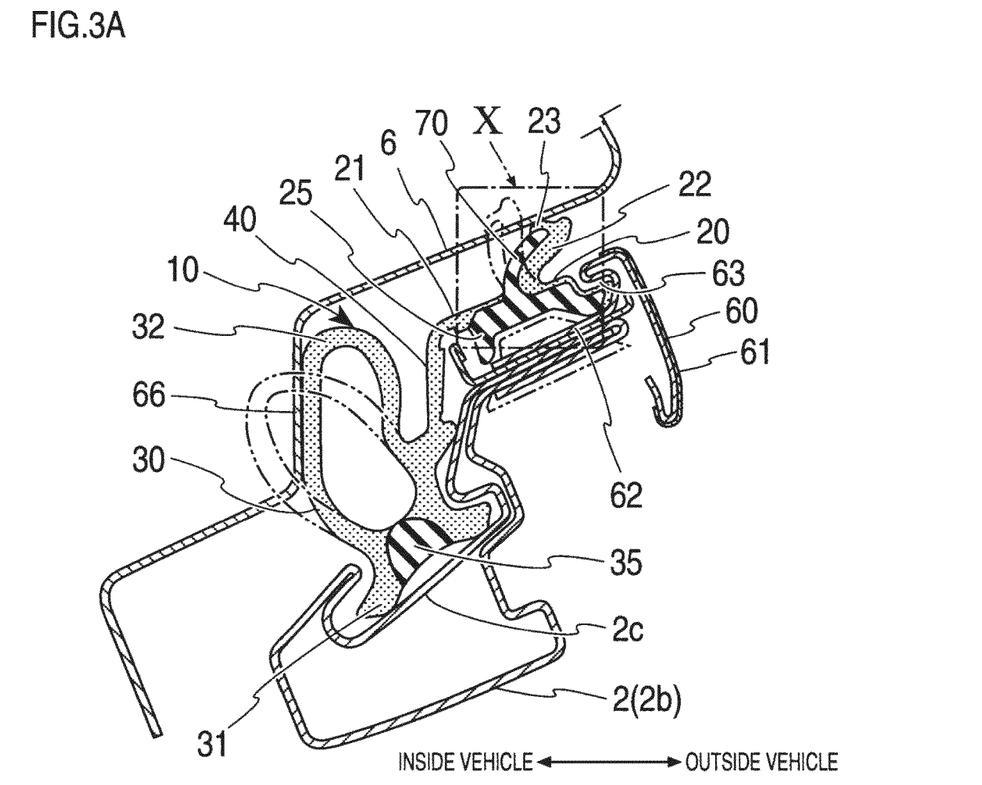
FIG. 3A is a cross-sectional view of a door weather strip used in a first embodiment taken along a line A-A in FIG. 1.
Figure 3B:
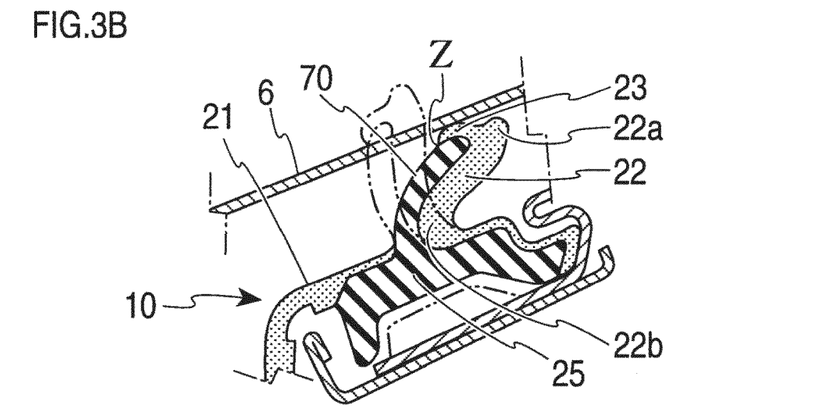
FIG. 3B is an enlarged view of a portion X in FIG. 3A.

FIG. 1 is a side view of a motor vehicle. As shown in FIG. 1, door frames 2 are provided on outer peripheries of upper portions of doors 1 of a motor vehicle on both a front side and a rear side, and door weather strips 10 are attached to the outer peripheries of the door frames 2 to seal a space between each of the door 1 and a vehicle body opening peripheral edge 6 (FIGS. 3A and 3B).

Figure 2:
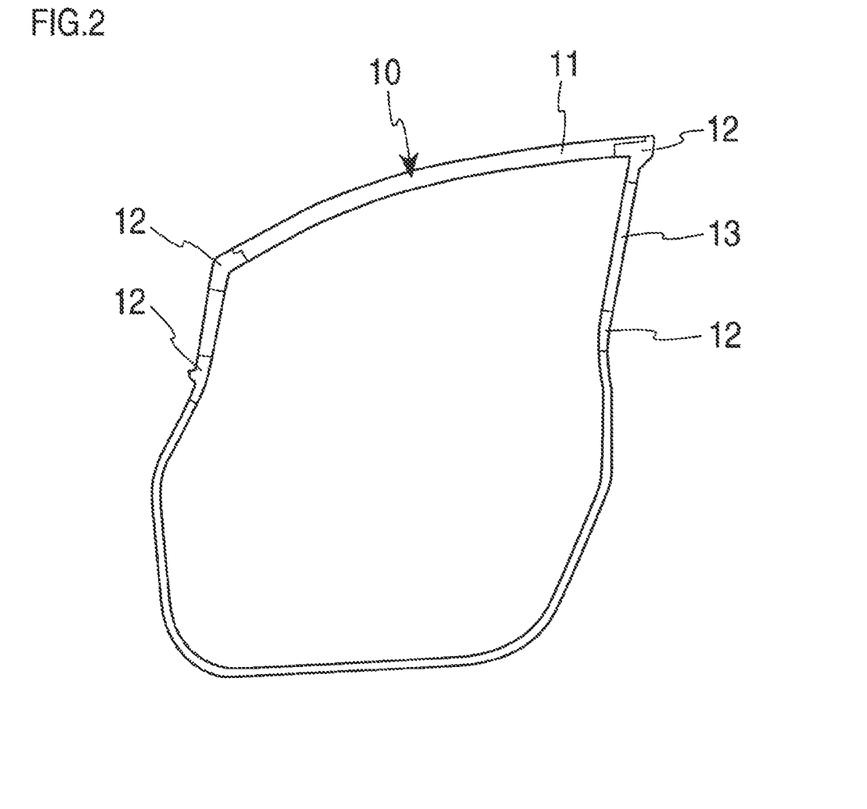
FIG. 2 is a plan view of a door weather strip as a whole used in the embodiments.

As shown in FIG. 2, an upper side portion 11 corresponding to an upper side and a vertical side portion 13 corresponding to a vertical side of the door frame 2 are formed into a long shape by extrusion molding in the door weather strip 10, and portions of corners 12 corresponding to corners of the door frame 2 are formed by connecting the upper side portion 11 and the vertical side portion 13 through die molding. Note that, the present invention relates to the upper side portion 11 of the door weather strip 10. Further, the present embodiment describes a left front door, but it is also applicable to a right front door and rear doors on both sides.

The first embodiment will be described with reference to FIGS. 3A and 3B. FIG. 3A is an enlarged view of the door weather strip 10 as a whole, and FIG. 3B is an enlarged view of a portion X in FIG. 3A. In the first embodiment, the door frame 2 to which the door weather strip 10 is attached is of a so-called hidden-type. As shown in FIG. 3A, the door frame 2 of the hidden-type has a tip narrow in width outside the vehicle, is covered with a door molding 60 attached to the outer periphery of the door frame 2, and is not visible from the vehicle exterior.

The door molding 60 is continuously formed by a molding portion 61 and a retainer portion 62. Note that, the molding portion 61 and the retainer portion 62 may be formed separately. In the door molding 60, the retainer portion 62 is fixed to the door frame 2 with a rivet, a clip, a screw, or the like.

The molding portion 61 has a predetermined width to cover the tip of the door frame 2, and has a lower end bent in a hairpin shape. A glass run not shown is sandwiched and held between the portion bent in the hairpin shape and an inner surface of the door frame 2. On the other hand, an upper end is similarly bent in the hairpin shape and continuous to the retainer portion 62. The molding portion 61 and the retainer portion 62 are formed by bending a sheet metal such as stainless steel.

The retainer portion 62 has a cross-sectional shape formed in a wide U shape with a widened bottom portion. A tip of the retainer portion 62 inside the vehicle is formed to be bent in the hairpin shape, and a recess 63 is formed at a side end portion of the retainer portion 62 outside the vehicle. A vehicle exterior attachment base 21 of a vehicle exterior weather strip 20 of the door weather strip 10 to be described later can be attached to and held by the recess 63.

The outer periphery of the door frame 2 inside the vehicle is formed at a position where the vehicle interior is lower stepwise than the vehicle exterior to which the retainer portion 62 is attached, and a door frame retainer portion 2c in a groove shape is formed such that a vehicle interior attachment base 31 of a vehicle interior weather strip 30 of the door weather strip 10 to be described later can be attached. The door frame retainer portion 2c is formed by bending an inner panel 2b of the door frame 2. Therefore, the vehicle interior weather strip 30 of the door weather strip 10 is attached at a position lower than the vehicle exterior weather strip 20.

As shown in FIG. 3A, the door weather strip 10 includes the vehicle exterior weather strip 20, the vehicle interior weather strip 30, and a connector 40 connecting the vehicle exterior weather strip 20 and the vehicle interior weather strip 30. The vehicle exterior weather strip 20 is attached to the door frame 2 outside the vehicle, that is, the retainer portion 62 described above, and seals the tip outside the vehicle between the vehicle body opening peripheral edge 6 and the door frame 2.

The vehicle exterior weather strip 20 of the door weather strip 10 includes the vehicle exterior attachment base 21, a seal lip 22, and a hard portion 70. Further, a core 25 is formed in a base portion of the vehicle exterior attachment base 21. In the vehicle exterior attachment base 21, bottom surfaces of side ends inside and outside the vehicle abut on the retainer portion 62 of the door molding 60, and the side end outside the vehicle is fitted and inserted into the recess 63 of the retainer portion 62 of the door molding 60.

Note that, in relation to the first disclosed aspect, the "attachment base" in " . . . the door weather strip includes an attachment base that is attached to the door frame or a door molding . . . " refers to the vehicle exterior attachment base 21.

The seal lip 22 is formed in a lip shape, and extends upward from the vehicle exterior attachment base 21 of the vehicle exterior weather strip 20 to protrudes outside the vehicle. A protrusion 23 that abuts on the vehicle body opening peripheral edge 6 when the door 1 is closed is formed at a tip 22a of the seal lip 22. When the door 1 is closed, the protrusion 23 abuts on the vehicle body opening peripheral edge 6, and the seal lip 22 is deflected to close a gap between the vehicle body opening peripheral edge 6 and the tip of the door molding 60. Further, the seal lip 22 is in the lip shape, and the seal lip 22 in a region excluding the protrusion 23 and the hard portion 70 to be described later in the seal lip 22 is easily deflected, and thus a door closing force can be reduced.

The hard portion 70 is formed in the seal lip 22. The hard portion 70 is formed to extend from a lower region of the protrusion 23, that is, from the base Z of the protrusion 23 toward the tip 22a side of the seal lip 22 to a root 22b side of the seal lip 22. Further, the hard portion 70 is formed to be connected to the core 25 of the vehicle exterior attachment base 21. In FIGS. 3A and 3B, the hard portion 70 inside the vehicle is formed to be exposed. Note that, the hard portion may be buried in the seal lip 22 without being exposed inside the vehicle, or formed to be exposed outside the vehicle. From a viewpoint of preventing the protrusion 23 from being bent at the base Z on the root side of the seal lip 22, in a case where the hard portion 70 is buried in the seal lip 22 and exposed outside the vehicle, a distance between the hard portion 70 and the base Z of the protrusion 23 is desirably ½ or less of a thickness of the seal lip 22. Further, the hard portion 70 may be formed at a position away from the vehicle exterior attachment base 21 without being connected.

As shown in FIG. 3A, the vehicle interior weather strip 30 of the door weather strip 10 includes the vehicle interior attachment base 31 and a hollow seal portion 32. The vehicle interior attachment base 31 is attached to the door frame retainer portion 2c, and the hollow seal portion 32 elastically contacts a bulge 66 of the vehicle body opening peripheral edge 6 inside the vehicle to seal a space between the vehicle body opening peripheral edge 6 and the door frame 2. The vehicle interior attachment base 31 is formed in a substantially plate shape, and has side ends of both sides can be respectively fitted into the door frame retainer portion 2c of the door frame 2 such that the vehicle interior weather strip 30 can be held. Further, a core 35 is formed at a center portion of the vehicle interior attachment base 31.

In the door weather strip 10, a solid material of a hard ethylene propylene diene rubber (EPDM) was used for the core 25 of the vehicle exterior attachment base 21, the core 35 of the vehicle interior attachment base 31, and the hard portion 70. A hardness of the solid material is an international rubber hardness (IRHD) of 60 or more.

On the other hand, a sponge material of a soft EPDM was used for the core 25, the vehicle exterior attachment base 21 other than the hard portion 70, the seal lip 22, the protrusion 23, the connector 40, the vehicle interior attachment base 31 other than the core 35, and the hollow seal portion 32. A specific gravity of the sponge material is 0.4 or more and 1.0 or less. Providing the cores 25 and 35 can increase rigidity of the vehicle exterior attachment base 21 and the vehicle interior attachment base 31. Note that, the cores 25 and 35 may not be formed.

Figure 4:
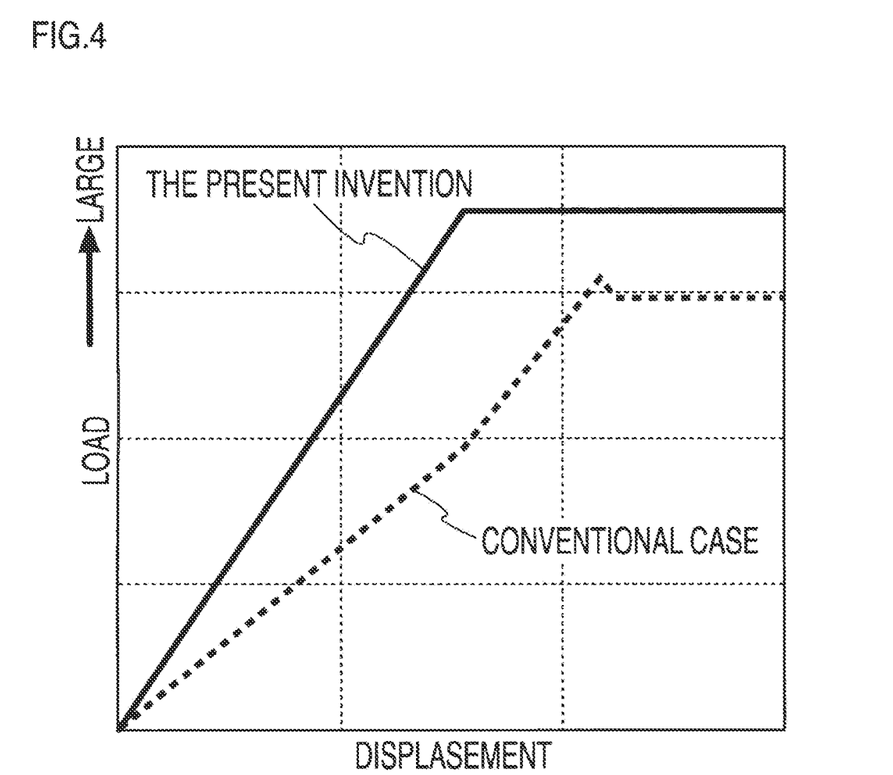
FIG. 4 is a graph showing a relationship between a displacement amount and a load in comparison between the first embodiment and a conventional case.

FIG. 4 shows a relationship between a displacement and a load of the seal lip 22 out of the vehicle with respect to a displacement of the seal lip 22 in a direction outside the vehicle and the generation of the reaction force F2 when the force F1 on the door frame 2 toward the vehicle width direction outward (outside the vehicle) is generated due to the pressure difference inside and outside the vehicle during the high-speed traveling of the motor vehicle. A broken line indicates the door weather strip 100 of Japanese Patent Application Laid-Open No. 2022-48478.

As is clear from FIG. 4, in the present invention, time until the load reaches a maximum value is shortened, or in the present invention, the maximum value of the load also increases.

The time to reach the maximum value is shortened. This is based on that the deflection of the tip 22a of the seal lip 22 is reduced due to the hard portion 70 below the protrusion 23 when the force F1 on the door frame 2 toward the vehicle width direction outward (outside the vehicle) is generated due to the pressure difference inside and outside the vehicle during the high-speed travelling of the motor vehicle, since the seal lip 22 is formed with the hard portion 70 harder than the material constituting the seal lip 22 to extend from the lower region of the protrusion 23 to the root 22b side of the seal lip 22.

Further, in the present invention, the maximum value of the load increases and a phenomenon in which a decrease of the load is observed after the maximum value of the load is reached as in a conventional case does not occur. This is based on that the protrusion 23 is not bent at the base Z (FIG. 11B) on the root side of the protrusion even when the F2 increases, since the hard portion 70 also exists in the lower region of the protrusion 23. As a result, the F2 can be equal to the F1 or close to the F1 quickly.

Accordingly, it is possible to further suppress sucking of the door frame out of the vehicle.

Figure 5:
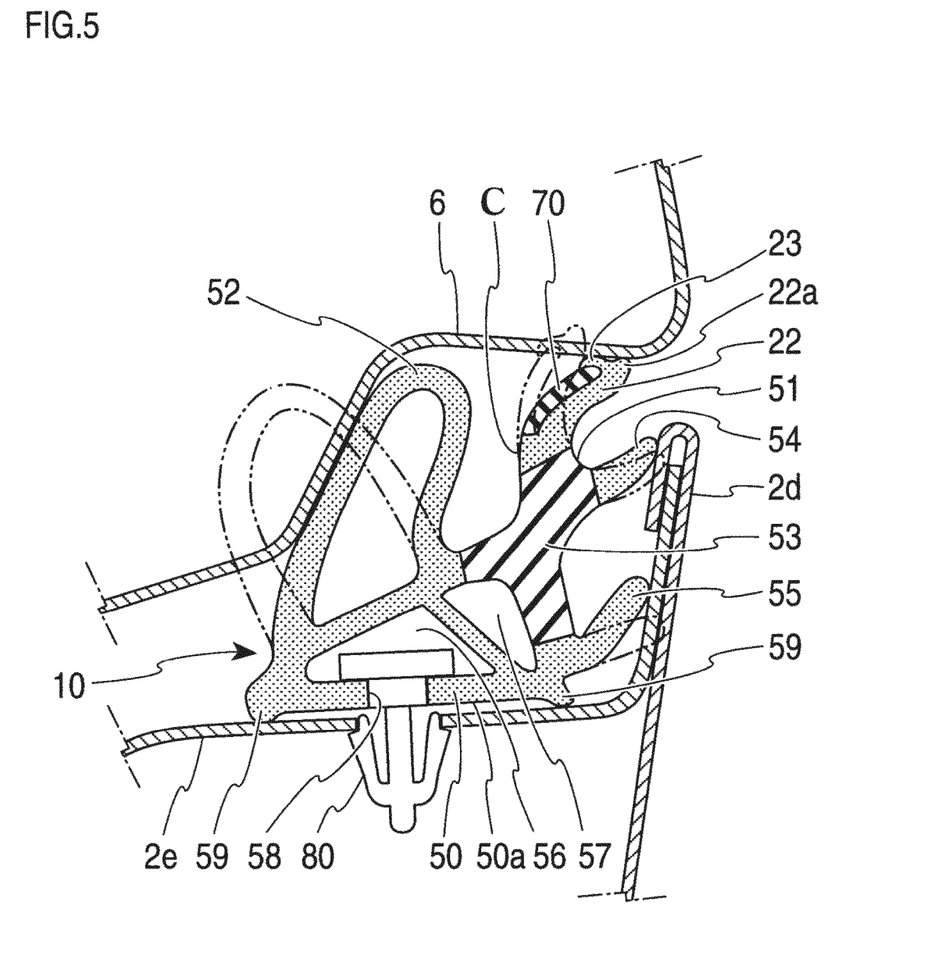
FIG. 5 is a cross-sectional view of a door weather strip used in a second embodiment taken along the line A-A in FIG. 1.

Next, the second embodiment will be described with reference to FIG. 5. In the second embodiment, the door frame 2 to which the door weather strip 10 is attached is of a press door type. The press door is a door having a structure in which an outer panel and an inner panel are integrally press-molded.

When the door is closed, the door weather strip 10 is attached between a vehicle interior surface of a door outer panel 2d as a vehicle outer plate and a vehicle interior surface of a door inner panel 2e in a contact manner. An upper end of the door inner panel 2e is fixed to the upper end of the door outer panel 2d disposed outside the vehicle with respect to the door inner panel 2e by hemming.

The door weather strip 10 includes an attachment base 50, a hollow seal portion 52, and a lip portion 51. The lip portion 51 includes the seal lip 22 abutting on the vehicle body opening peripheral edge 6, a door outer panel abutment portion 54 abutting on the door outer panel 2d, and a door inner panel abutment portion 55 abutting on the door inner panel 2e.

The attachment base 50 is disposed to face the door inner panel 2e, and has a recess 50a at a position where the attachment base faces the door inner panel. A ridge 59 is formed at an end of the recess 50a inside and outside the vehicle, and the ridge 59 abuts on the door inner panel 2e. Further, a hole 58 is formed in the attachment base 50, and fixed by, for example, a resin clip 80 that penetrates and sandwiches both the attachment base 50 and the door inner panel 2e.

The hollow seal portion 52 extends from the attachment base 50 inside the vehicle toward the vehicle body opening peripheral edge 6, and contacts the vehicle body opening peripheral edge 6 when the door is closed to seal a space between the vehicle interior and the vehicle exterior. Further, a first hollow portion 56 and a second hollow portion 57 are formed between the hollow seal portion 52 and the attachment base 50.

The vehicle body opening peripheral edge 6 side at the tip 22a of the seal lip 22 is formed with the protrusion 23 that abuts on the vehicle body opening peripheral edge 6 when the door 1 is closed. The hard portion 70 is formed to extend from the lower region of the protrusion 23 to the root 22b side of the seal lip 22. In the present embodiment, the hard portion 70 is not formed at a portion where the seal lip 22 is greatly deformed, that is, a portion C in FIG. 5 when the door 1 is opened or closed. Note that, in FIG. 5, although the hard portion 70 is formed to be exposed inside the vehicle, as in the first embodiment, the hard portion may be buried in the seal lip 22 without being exposed inside the vehicle, or formed to be exposed outside the vehicle.

From the viewpoint of preventing the protrusion 23 from being bent at the base Z on the root side of the seal lip 22, in the case where the hard portion 70 is buried in the seal lip 22 and exposed outside the vehicle, the distance between the hard portion 70 and the base Z of the protrusion 23 is desirably ½ or less of the thickness of the seal lip 22.

The solid material of the hard ethylene propylene diene rubber (EPDM) was used for the seal lip 22 of the lip portion 51, as well as a lip portion root 53 of the roots of the door outer panel abutment portion 54 and the door inner panel abutment portion 55 similarly to the hard portion 70. A hardness of the solid material is an international rubber hardness (IRHD) of 60 or more.

On the other hand, the sponge material of the soft EPDM was used for the attachment base 50, the hollow seal portion 52, the seal lip 22, the door outer panel abutment portion 54, and the door inner panel abutment portion 55. A specific gravity of the sponge material is 0.4 or more and 1.0 or less.

Since the hard portion 70 is not formed in a portion (the portion C in FIG. 5) where the seal lip 22 is greatly deformed when the door 1 is opened or closed, when the force F1 on the door frame 2 toward the vehicle width direction outward (outside the vehicle) is generated due to the effects of the hard portion 70, that is, the pressure difference inside and outside the vehicle during the high-speed traveling of the motor vehicle, it is possible to prevent the deflection of the tip 22a of the seal lip 22 from being reduced due to the hard portion 70 below the protrusion 23, prevent the protrusion 23 from being bent at the base on the root side Z of the protrusion even when the F2 increases, and prevent the door 1 from being hardly closed while maintaining the F2 large.

In the second embodiment, the hard portion 70 is not formed in the portion where the seal lip 22 is greatly deformed (the portion C in FIG. 5) when the door 1 is opened or closed, but may be formed to be thin.

Figure 6A:
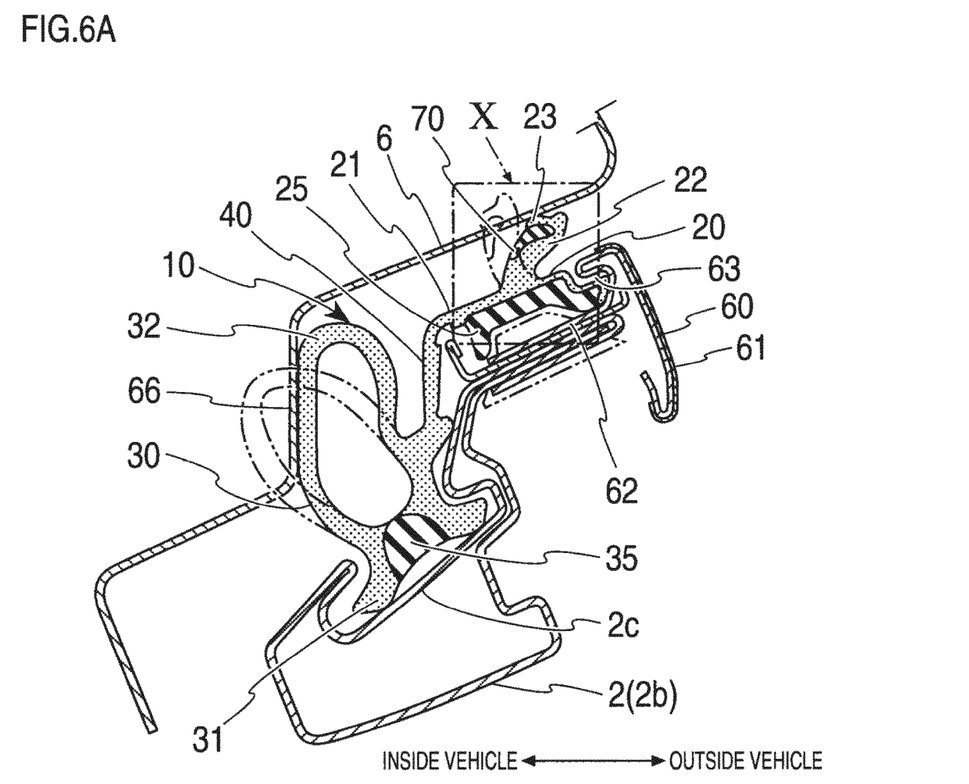
FIG. 6A is a cross-sectional view of a door weather strip used in a third embodiment taken along the line A-A in FIG. 1.
Figure 6B:
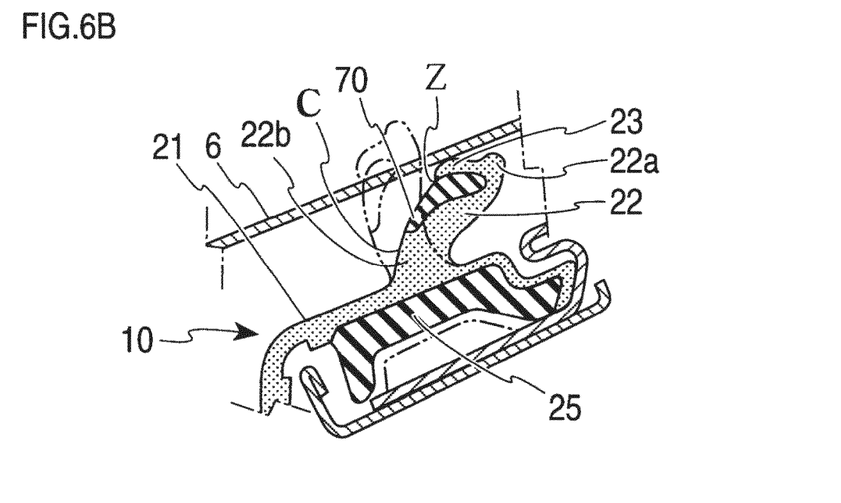
FIG. 6B is an enlarged view of a portion X in FIG. 6A.

Next, the third embodiment will be described with reference to FIGS. 6A and 6B. FIG. 6A is an enlarged view of the door weather strip 10 as a whole, and FIG. 6B is an enlarged view of the portion X in FIG. 6A. This third embodiment is a modified version of the first embodiment. Parts described in the first embodiment are denoted by the same reference numerals. Note that, description of each part will be omitted.

In the third embodiment, the hard portion 70 is on the root 22b side of the seal lip 22, and is not formed in a portion where the seal lip 22 is greatly deformed when the door 1 is opened or closed (a portion C in FIG. 6B). Note that, the seal lip 22 may be formed thin at the portion where the seal lip is greatly deformed when the door 1 is opened or closed. Further, the sealing lip 22 is formed to be exposed from the lower region of the protrusion 23 to the root 22b side of the seal lip inside the vehicle. Then, the thickness increases toward the tip 22a side of the seal lip 22, and further, the hard portion 70 is formed under the protrusion 23 to bulge in a shape close to a letter D in the direction of the tip 22a of the seal lip 22 and the direction of the seal lip 22 outside the vehicle.

As a result, the amount of the deflection of the tip 22a of the seal lip 22 can be reduced to prevent the protrusion 23 from being bent at the base Z on the root side of the protrusion, and the reaction force F2 in the lower region of the protrusion 23 can be increased, and thus the reaction force F2 can be made equal to the F1 or close to the F1 at an early stage even in a case where the hard portion 70 is not formed at the portion where the seal lip 22 is greatly deformed or is formed thinner than the tip 22a side of the seal lip 22 when the door 1 is opened or closed.

In the third embodiment, the hard portion 70 is formed to be exposed inside the vehicle, but may be formed to be buried in the seal lip 22. In a case of being buried and formed, from the viewpoint of preventing the protrusion 23 from being bent at the base Z on the root side of the seal lip 22, the distance between the hard portion 70 and the base Z of the protrusion 23 is desirably ½ or less of the thickness of the seal lip 22.

Figure 7A:
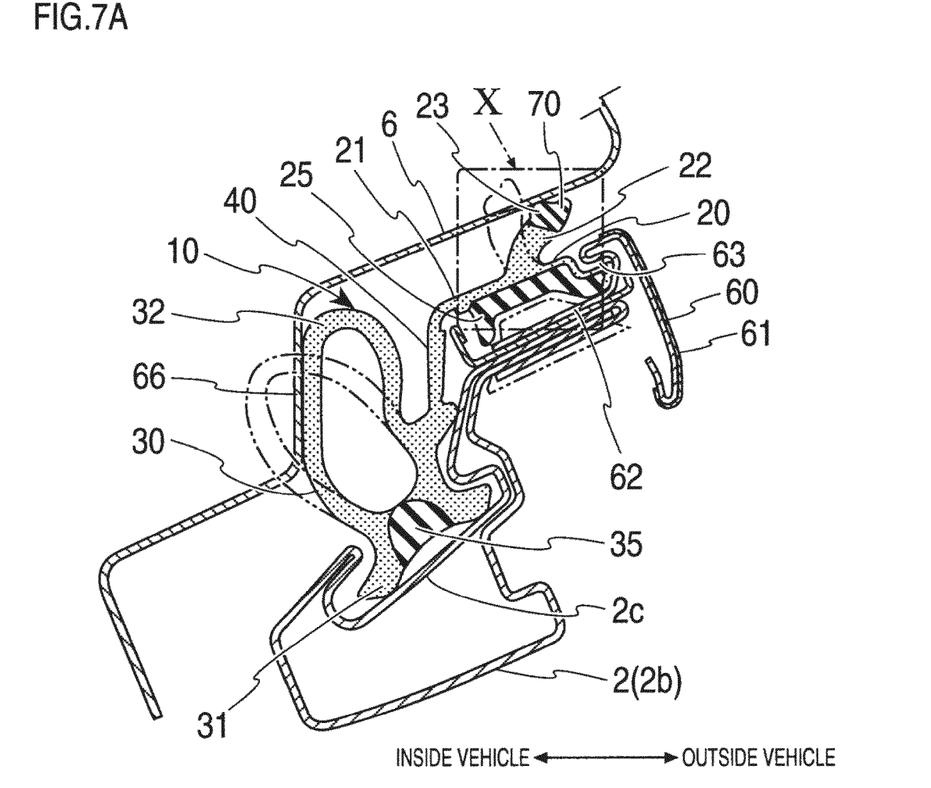
FIG. 7A is a cross-sectional view of a door weather strip used in a fourth embodiment taken along the line A-A in FIG. 1.
Figure 7B:
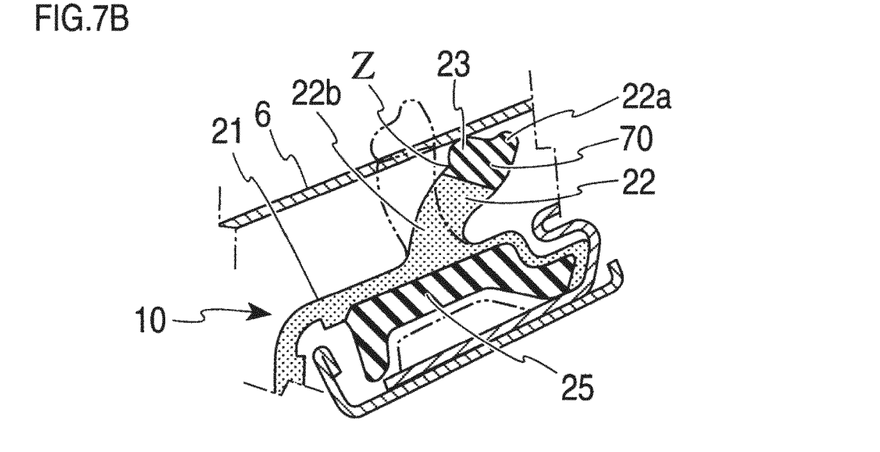
FIG. 7B is an enlarged view of a portion X in FIG. 7A.

Next, the fourth embodiment will be described with reference to FIGS. 7A and 7B. FIG. 7A is an enlarged view of the door weather strip 10 as a whole, and FIG. 7B is an enlarged view of the portion X in FIG. 7A. The door frame 2 used in the fourth embodiment is of a hidden-type similar to that in the first embodiment. Parts described in the first embodiment are denoted by the same reference numerals. Note that, description of each part will be omitted.

As shown in FIGS. 7A and 7B, in the fourth embodiment, the hard portion 70 is formed in the region that includes the vicinity of the base Z of the root 22b of the seal lip 22 of the protrusion 23, and crosses the seal lip 22 in the direction of the tip 22a of the seal lip 22 from the vehicle interior to the vehicle exterior. The "vicinity of the base Z of the root 22b of the seal lip 22 of the protrusion 23" means the root 22b side when the protrusion 23 is not bent at the base Z on the root side of the protrusion with respect to an increase in the F2.

Forming the hard portion 70 in an entire region from the protrusion 23 toward the root 22b side of the seal lip 22 to the direction of the tip 22a extremely reduces the amount of the deflection of the tip 22a of the seal lip 22, and can shorten the time for the reaction force F2 to be equal to the F1 or close to the F1.

Further, since the protrusion 23 is not bent at the base on the root side of the protrusion with respect to the increase in the F2, the reaction force F2 can be increased to be equal to the F1 or close to the F1. As a result, it is possible to suppress sucking of the door frame 2 out of the vehicle.

In the fourth embodiment, as shown in FIGS. 7A and 7B, the hard portion 70 is formed in the entire region in the direction of the tip 22a of the seal lip 22, but there may be a portion where the hard portion 70 is not formed at the tip 22a of the seal lip 22.

Figure 8A:
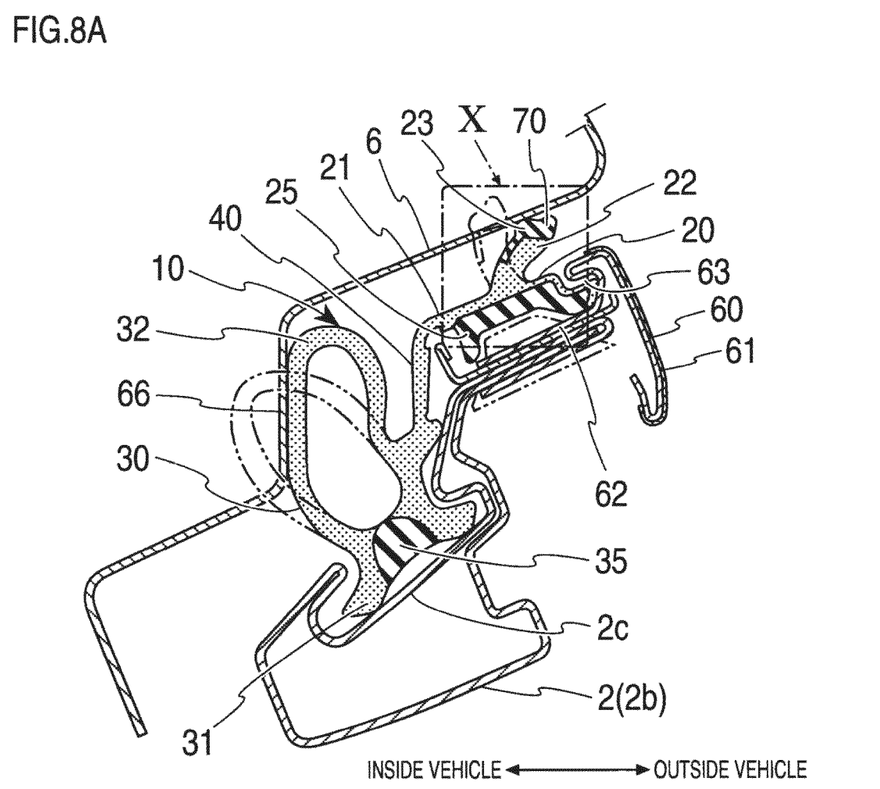
FIG. 8A is a cross-sectional view of a door weather strip used in a fifth embodiment taken along the line A-A in FIG. 1.
Figure 8B:
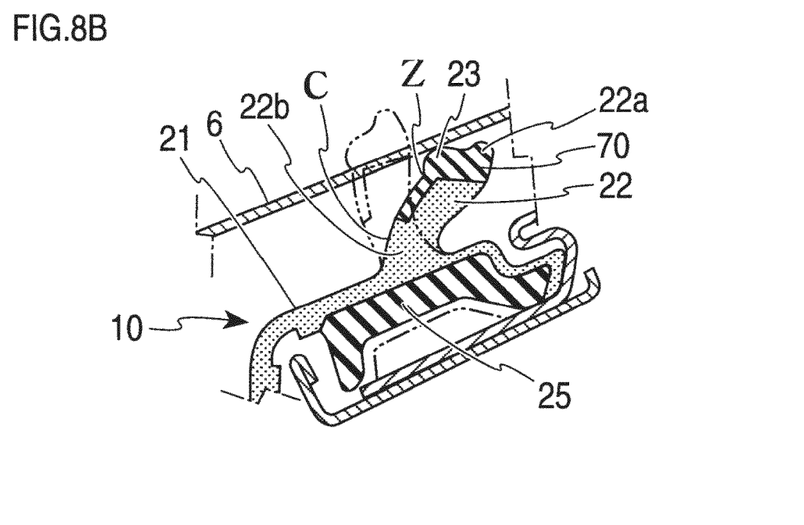
FIG. 8B is an enlarged view of a portion X in FIG. 8A.

Next, the fifth embodiment will be described with reference to FIGS. 8A and 8B. FIG. 8A is an enlarged view of the door weather strip 10 as a whole, and FIG. 8B is an enlarged view of the portion X in FIG. 8A. This fifth embodiment is a modified version of the fourth embodiment. Parts described in the first embodiment are denoted by the same reference numerals. Note that, description of each part will be omitted.

In the fourth embodiment described above, since the hard portion 70 is formed mainly on the tip 22a side of the seal lip 22, there is a concern that the effects of the hard portion 70 may be deteriorated due to the deflection on the root 22b side of the seal lip 22 due to the hard portion 70.

In the fifth embodiment, the hard portion 70 is formed to extend to the root 22b side of the seal lip 22. Specifically, the hard portion 70 is formed in the entire region from the protrusion 23 toward the root 22b side of the seal lip 22 to the tip 22a (the fourth embodiment described above), and formed to be exposed to the seal lip 22 inside the vehicle. Note that, the portion extending may be buried and formed in the seal lip 22 without being exposed inside the vehicle, or formed to be exposed outside the vehicle. Further, the hard portion 70 may not be formed at the portion where the seal lip 22 is greatly deformed (the portion C in FIG. 8B) when the door 1 is opened and closed, or may be formed to be thin.

As a result, since the bending of the base Z of the protrusion 23 and the deflection of the seal lip 22 can be suppressed due to the hard portion 70, the reaction force F2 can be equal to the F1 or close to the F1 at the early stage.

The hard portion 70 of the first, third, fourth, and fifth embodiments can also be applied to the hard portion 70 of the second embodiment, and the hard portion 70 of the second embodiment can also be applied to the first, third, fourth, and fifth embodiments.

The embodiments of the present invention are not limited to the embodiments described above, and various modifications can be made without departing from the object of the present invention.

For example, in the first embodiment and the third to fifth embodiments described above, the door weather strip 10 is integrally formed with the vehicle exterior weather strip 20, the vehicle interior weather strip 30, and the connector 40 connecting the vehicle exterior weather strip 20 and the vehicle interior weather strip 30, but the vehicle exterior weather strip 20 and the vehicle interior weather strip 30 may be separately formed and separately attached without forming the connector 40, the vehicle interior weather strip 30 may not be formed either, and only the vehicle exterior weather strip 20 may be formed and attached as in the second embodiment.

For example, in the first to fifth embodiments described above, the door weather strip 10 is formed by the EPDM, but may be formed by an olefinic thermoplastic elastomer (TPO) or a dynamically crosslinked thermoplastic elastomer (TPV).

For example, in the first to fifth embodiments, the hard portion 70 is formed by using the solid material of the EPDM having the international rubber hardness (IRHD) of 60 or more, but the hard portion may be formed by the TPO or the TPV described above, or may be formed by a resin such as PP.

What is claimed is:

1. A door weather strip sealing a space between a door of a motor vehicle and a vehicle body opening peripheral edge and attached to an outer periphery of a door frame of the door, the door weather strip comprising:
    an attachment base that is attached to the door frame or a door molding; and
    a seal lip that abuts on the vehicle body opening peripheral edge when the door is closed, wherein
    a vehicle body opening peripheral edge side of the seal lip, at a tip of the seal lip, is formed with a protrusion that abuts on the vehicle body opening peripheral edge when the door is closed;
    the seal lip is formed with a hard portion that is harder than a material constituting the seal lip and that extends from a tip side of the seal lip at a base of the protrusion to a root side of the seal lip,
    the hard portion extends from a lower end of the base of the protrusion to a direction of the tip of the seal lip,
    the hard portion extends toward an outside of the vehicle at the tip side of the seal lip,
    the hard portion extends toward a base of the seal lip but is not formed in the base of the seal lip, and
    a longitudinal axis of the hard portion extends toward the tip of the seal lip and curves toward the outside of the vehicle.
2. The door weather strip according to claim 1, wherein the hard portion is not formed at the root side of the seal lip, or is formed thinner than the tip side of the seal lip.
3. The door weather strip according to claim 1, wherein the hard portion at the root side of the seal lip is thinner than at the tip side of the seal lip.
4. The door weather strip according to claim 1, wherein a distance between the hard portion and the base of the protrusion is ½ or less of a thickness of the seal lip.
5. The door weather strip according to claim 1, wherein the hard portion is formed to be exposed outside the vehicle.
6. The door weather strip according to claim 5, wherein a distance between the hard portion and the base of the protrusion is ½ or less of a thickness of the seal lip.
7. The door weather strip according to claim 1, wherein the hard portion forms an exterior surface of the seal lip that is configured to be exposed outside the vehicle.
8. The door weather strip according to claim 1, wherein the hard portion is arc-shaped.
9. The door weather strip according to claim 8, wherein at least one end of the hard portion is enveloped by the seal lip.
10. The door weather strip according to claim 1, wherein at least one end of the hard portion is enveloped by the seal lip.

* * * * *